Patented Aug. 30, 1932

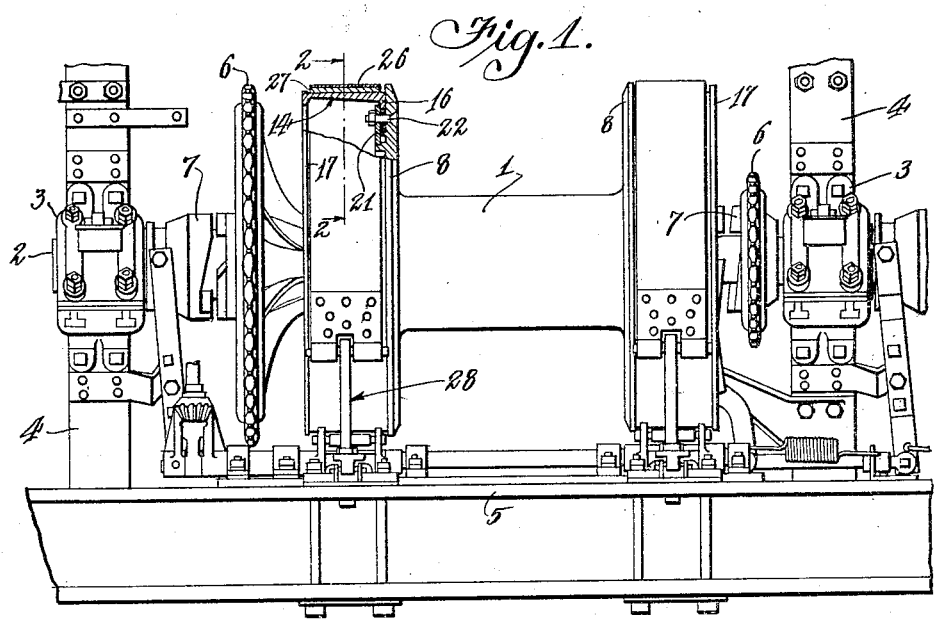
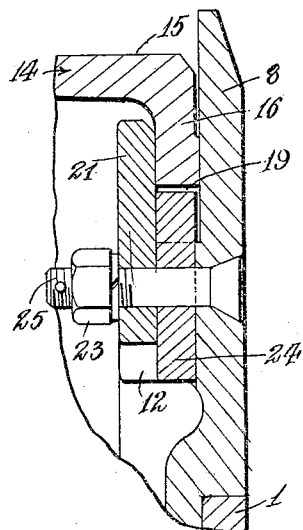
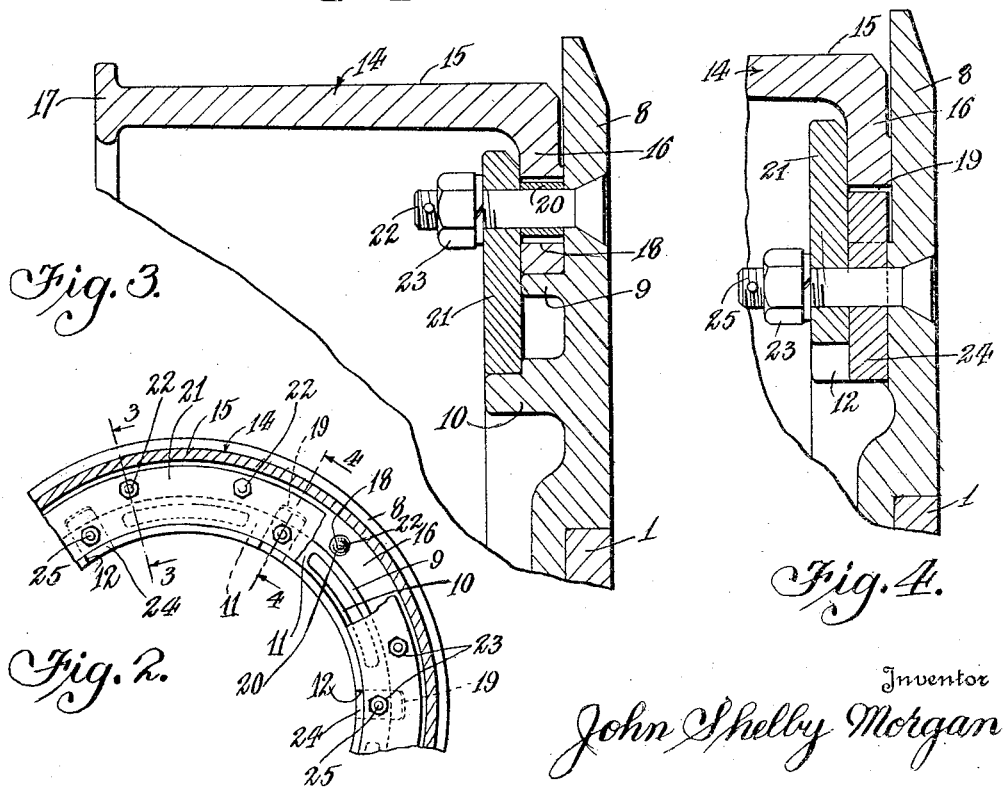

1,874,574

UNITED STATES PATENT OFFICE

JOHN SHELBY MORGAN, OF INGLEWOOD, CALIFORNIA, ASSIGNOR TO THE NATIONAL SUPPLY COMPANY OF DELAWARE, OF NEW YORK, N. Y., A CORPORATION OF DELAWARE

BRAKE RIM CONSTRUCTION

Application filed February 3, 1930. Serial No. 425,473.

This invention relates to an improvement in brake rim construction, and especially to an improvement in brake rim construction for rotary drawworks used in deep well drilling.

The brakes of a rotary drawworks are used to control the speed of the drill rod as it is being run into the well, also to stop and hold the drill rod, and are used for innumerable other purposes. With the greater speed of the drilling operations and with the greater depth to which wells are now being drilled, the brakes are called upon to absorb greater and greater amounts of power.

The power absorbed by the brakes is converted into heat and at times the brake drums are rapidly heated to a relatively high temperature.

As the expansion of the rim is in direct proportion to the change in temperature, the brake rim expands and contracts rapidly whereas the winding drum remains at a more nearly uniform temperature and therefore in structures where the brake rim is formed integral with or bolted solidly to the winding drum, the difference in expansion between the brake rim and winding drum develops tremendous stress between these parts which causes working in the metal forming the parts to such an extent that crystallization of the metal takes place and occasionally results in cracking, or in a total fracture of the part, which endangers the life of the drilling crew and also the destruction of the drilling equipment.

It is the principal object of this invention to so mount the brake rim upon the winding drum as to enable the brake rim to expand or contract freely without developing stress within the brake rim or within the winding drum, and likewise allowing the winding drum to expand or contract freely without developing stress within the brake drum.

It is a further object to provide a brake rim which may be easily mounted and removed from the winding drum.

It is a further object to provide a brake rim mounting which will provide a sliding connection between the brake rim and winding drum.

It is a further object to provide such a mounting with suitable brake rim driving means which will not hinder the free expansion or contraction of the brake drum or winding drum.

Other objects and advantages of this invention will be apparent from the following detailed description of a preferred embodiment thereof, as illustrated in the accompanying drawing, in which drawing, Fig. 1 illustrates a rotary drawworks and further illustrates a portion in section showing the mounting of the improved brake rim upon the winding drum.

Fig. 2 illustrates an enlarged sectional view taken substantially along the line 2—2 of Fig. 1.

Fig. 3 illustrates an enlarged sectional view taken substantially on the line 3—3 of Fig. 2.

Fig. 4 illustrates an enlarged sectional view taken substantially on the line 4—4 of Fig. 2.

In the preferred embodiment of this invention, illustrated in the accompanying drawing, a winding drum 1 is suitably mounted upon a shaft 2 journaled in bearings 3 mounted upon a standard 4 of a base 5.

The shaft 2 is provided with the usual driving sprockets 6 and clutch mechanism 7.

The important feature of this invention resides in the brake drum mounting which permits either the brake drum or winding drum to expand or contract freely, and this feature will now be described.

The winding drum 1 is provided with end flanges 8. Either end flange or both of the end flanges 8 may be provided with a brake drum mounting comprising a brake drum centering flange 9, a clamping ring supporting flange 10 connected together by spaced bosses 11, and having driving key slots 12 cut through the center of each of the bosses 11.

A brake drum 14 is provided with an annular braking surface 15, an inwardly projecting flange 16 and a stiffening flange 17. The flange 16 is provided with a plurality of clamping bolt slots 18 and a plurality of open ended driving key slots 19 positioned to communicate with the driving key slot 12.

Each of the clamping bolt slots 18 is provided with a bushing 20 which is substantially the same width as the slot but shorter than the length of the slot to enable the brake drums to expand or contract without having the ends of the slot contact the bushing 20.

A clamping ring 21 is mounted upon the flange 10 and the bushing 20 and extends over a greater portion of the flange 16. A bolt 22 is provided for each bushing 20 and extends through the end flange 8, bushing 20 and clamping ring 21, and is secured in position by a suitable nut 23.

To drive the drum 14 a single or a plurality of driving keys 24 may be inserted in the winding drum key slots 12 and extending into the brake drum key slots 19. To retain the driving keys 24 in operative position a bolt 25 passes through each driving key and clamps the key 24 between the winding drum end flange 8 and the clamping ring 21.

It is desirable that the inner surface of the end flanges should be flush and for that reason the bolts 22 and 25 are provided with conical heads fitting into countersunk holes.

From the description of the improved brake drum construction, it will be seen that the brake drum 14 is slidably held between the end flange 8 and the clamping ring 21 and is centered by the flange 16 engaging the centering flange 9 and that sufficient space is provided in the slots 18 to permit the brake drum with the flange 16 to expand or contract freely without stressing the winding drum. It will also be noted that the driving keys 24 engage the open ended slots 19 in such manner that the drum is driven by the keys but is not prevented from expanding or contracting.

In operative relation with the brake drum 14 are the brake bands 26 having brake linings 27, and the usual operating mechanism 28.

Having fully described a preferred embodiment of my invention, it is to be understood that I do not wish to be limited to the exact details herein set forth, which may obviously be varied without departing from the spirit of my invention, as set forth in the appended claims.

I claim:

1. A brake drum mounting comprising a supporting member having a centering and clamping flange, a clamping ring and means for securing said ring to said member, and a brake drum having a mounting flange by which said drum is clamped between said member and clamping ring to enable the drum to expand or contract freely without developing stress in said supporting member or drum.

2. A brake drum mounting including, a supporting member having a brake drum centering flange, and a clamping ring supporting flange, and also having a plurality of driving key slots and a plurality of clamping bolt holes; a brake drum having a flange arranged to slidably fit upon said centering flange and also having a plurality of clamping bolt and key slots; a bushing for each of said brake drum clamping bolt slots; a clamping ring mounted upon said clamping ring flange and upon said bushings, to enable the brake drum to expand or contract freely without stressing the drum or supporting member; a plurality of clamping bolts arranged to pass through the bolt holes in said supporting member and through said bushings and also through said clamping ring to clamp the structure in operative relation; a driving key positioned in each of said key slots whereby said brake drum is driven; and a retaining bolt for each driving key.

3. A brake drum mounting including a brake drum having an inwardly projecting flange and having a plurality of slots positioned in said flange; a bushing for each slot; a supporting member having an annular brake drum centering flange for supporting and centering said drum said flange being substantially of the same thickness as said brake drum flange; a clamping ring mounted upon said annular flange and said bushings; and bolt means for clamping said clamping ring to said annular flange and bushings to provide a driving yet slidable connection between said drum and said supporting member.

4. A brake drum mounting including a brake drum having a projecting flange, and having a plurality of slots positioned in said flange; a bushing for each slot of slightly greater thickness than said flange; a supporting member having an annular brake drum centering flange for centering said drum, which is of substantially the same thickness as said bushings; a clamping ring mounted upon said annular flange and said bushings; and a bolt extending through each of said bushings for clamping said ring to said spacers and said supporting member.

Signed at Torrance, California, this 27th day of January 1930.

JOHN SHELBY MORGAN.